United States Patent [19]

Hirakawa et al.

[11] Patent Number: 5,496,431
[45] Date of Patent: Mar. 5, 1996

[54] METHOD AND SYSTEM FOR CHANGING PRODUCT SPECIFICATIONS IN A CORRUGATION MACHINE

[75] Inventors: Tadashi Hirakawa; Yukuharu Seki; Makoto Ando, all of Mihara, Japan

[73] Assignee: Mitsubishi Jukogyo Kabushiki Kaisha, Japan

[21] Appl. No.: 166,838

[22] Filed: Dec. 15, 1993

[30] Foreign Application Priority Data

Jan. 14, 1993 [JP] Japan ................... 5-020825

[51] Int. Cl.⁶ ................ B26D 3/00; B32B 31/18
[52] U.S. Cl. .......... 156/269; 156/210; 156/271; 156/470; 156/353; 156/523; 156/524; 156/529; 83/53; 83/177; 83/428
[58] Field of Search ............ 156/470, 210, 156/523, 529, 353, 269, 271, 524, 270; 83/428, 614, 53, 177

[56] References Cited

U.S. PATENT DOCUMENTS

| | | | |
|---|---|---|---|
| 3,485,128 | 12/1969 | Siegenthaler | 83/428 |
| 4,240,856 | 12/1980 | Craemer et al. | 156/269 |
| 4,266,112 | 5/1981 | Niedermeyer | 83/428 |
| 4,268,341 | 5/1981 | Huhne | 156/269 |
| 4,845,720 | 7/1989 | Koishi et al. | 372/31 |
| 4,965,733 | 10/1990 | Kimura et al. | 83/614 |
| 5,031,496 | 7/1991 | Lobash et al. | |

FOREIGN PATENT DOCUMENTS

| | | |
|---|---|---|
| 0065014 | 11/1982 | European Pat. Off. . |
| 0468374 | 1/1992 | European Pat. Off. . |
| 2529817 | 1/1984 | France . |
| 1454971 | 9/1970 | Germany ................ 83/428 |
| 3248536 | 12/1982 | Germany . |
| 2040779 | 9/1980 | United Kingdom . |

OTHER PUBLICATIONS

Kato Tsuyoshi, "Laser Beam Cutting and Processing Device", Patent Abstracts of Japan, Publication No. JP 61033787, Publ. Feb. 17, 1986.

Primary Examiner—Michele K. Yoder
Attorney, Agent, or Firm—Rothwell, Figg, Ernst & Kurz

[57] ABSTRACT

A product order specification change system for a corrugation machine having a slitter-scorer device and a plurality of cutoff devices for producing corrugated board sheets having various widths and lengths, includes a cutting apparatus wherein at an order change where specifications for the sheet width are changed from one order to the next, a region is formed between the leading end of the new order sheets and the trailing end of the old order sheets, wherein a transitional slit groove is cut connecting a slit groove of the old order sheets with a slit groove of the new order sheets. As a result, the web can be stably transferred through stages of the machine, the cutting dimension accuracy can be maintained precisely, and faults such as jamming can be eliminated.

19 Claims, 8 Drawing Sheets

METHOD AND SYSTEM FOR CHANGING PRODUCT SPECIFICATIONS IN A CORRUGATION MACHINE

BACKGROUND OF THE INVENTION

1. Field of the Invention

The present invention relates to a system for changing production orders in a corrugation machine which produces corrugated boards cut to different specific widths and lengths according to customers' needs.

2. Related Art

A product specification order change system of a corrugation machine to which the present invention is applicable is shown in FIG. 2. A continuous corrugated board web 3, produced in a preceding portion of the corrugation machine not shown in the figure, enters the order change system portion of the machine at the right hand side of the figure and moves to the left in the direction of the arrows. As described in more detail below, element 2 is a rotary shear section, elements 1a and 1b are slitter-scorer sections, and element 22 is a length cut-off section.

As shown in FIG. 8, a rotary shear 2 comprises a knife cylinder 25 having a knife 24 fixed thereon substantially along the total length thereof, and an anvil cylinder 26 mounted in parallel cooperating relationship with the knife cylinder 25. According to one conventional apparatus, the anvil cylinder 26 has a tapered diametrical shape along its length formed by an elastic body 27 which decreases in thickness from the central portion of the cylinder to a predetermined distance from the peripheral surface thereof. With this construction, the relative phase of the knife cylinder 25 with respect to the anvil cylinder 26 can be changed. By rotating the two cylinders 25 and 26 as the corrugated web 3 passes therethrough, the rotary shear 2 can either cut slits of predetermined length in the edges of the web 3 as shown, or can completely cut the web 3 along its width, as a function of the relative phase set between the cylinders. The rotary shear 2 performs the function of changing over the width setting of the trim 23a, 23b at the edges of the corrugated web so as to produce the desired width $W_0$ of corrugated sheet product generally designated by numeral 5 in FIG. 8. As shown, a plurality of product sheets 5(A)–5(D) can be produced by the corrugation machine. According to another conventional apparatus, the anvil cylinder 26 has a cylindrical shape along its axis formed by an elastic body 27. The rotary shear 2 can completely cut the web 3 along its width plural times by rotating the cylinders 25 and 26 as the web 3 passes therethrough, creating a gap in the continuous web of sufficient length that a "window" is created, providing sufficient time for the downstream apparatus such as the standby slitter-scorer 1b to switch from standby mode to the in-use mode as shown by 11a. Additionally, the cutoff device 22 can switch over to the next sheet length specification setting.

Next, the function of the slitter-scorer portions 1a–1b of the corrugation machine will be outlined with reference to FIGS. 2 and 8. The slitter-scorers 1a, 1b comprise a pair of upper and lower scorers 28a and 28b and a pair of upper and lower slitter knives 29a and 29b. The scorers 28a and 28b are used to place predetermined score lines on the corrugated web and the slitter knives 29a and 29b are used to form slit grooves in the web such as groove M for dividing the web into separate product sheets and trimming off the trim portions 23a and 23b. Two slitter-scorers 1a and 1b are typically installed along the web running direction to shorten the downtime of the machine required for changing the settings due to a change in product specifications for a new customer order to be processed, with an alternate one of the two slitter-scorers being used for each successive order. The width W of the corrugated board web 3 is set slightly wider than the overall width $W_o$ of the finished product sheets, so that the ends of the web where defects such as deviations in paper adhesion level or paste overflow occur are cut off as waste trim 23a, 23b and disposed of into trim ducts 30a and 30b.

In order to change product sheet specification settings due to an order change, assuming that slitter-scorer 1a is in use, the trim position of the new order to be processed is sent as a signal from a system controller (not shown) to the standby slitter scorer 1b, where the position setting of the trim duct 30b and various settings for the new order are performed. At the same time, on the trim cutting rotary shear 2, the position of the knife 24 and the relative angle of the anvil cylinder 26 with respect to the knife cylinder 25 are set to attain the appropriate cutting length of the widthwise end notches or slits in the ends of the corrugated board web 3. The knife cylinder 25 and the anvil cylinder 26 are then synchronously rotated at predetermined timing intervals as the corrugated board web 3 passes through to form trim cutting notches at desired positions in the web.

As the notch positions reach the standby slitter-scorer 1b, the pair of upper and lower scorers 28b are engaged with the web, and then the pair of upper and lower slitter knives 29b are engaged, by which processing of the new order is performed.

On the other hand, the slitter-scorer 1a processing the old order successively releases the engagement of the upper and lower scorers 28a and the slitter knives 29a at the time that the front edge of the corrugated web of the new order reaches it. Slitter-scorer 1a then assumes a standby state and receives order change settings for the next order. The operations described above function to change only the trim width at the edges of the web according to a product order change in a two-sheet production setting, that is, the system changes from producing product sheets 5(C) and 5(D) to producing product sheets 5(A) and 5(B).

The conventional order change system can stably change product specifications under limited conditions such as where the slit groove M for separating the two sheets is continuous, where the cut lengths of the two sheets are the same even if the slit groove M is discontinuous between orders, or where only one product sheet is produced from the continuous web (not shown).

However, in addition to the width of the product sheets, the cutting lengths $L_T$ and $L_D$ in a two-sheet production are often changed also as shown in FIG. 8. When the desired cutting lengths of the two product sheets are different, the paths of the sheets diverge at a length cutoff section 22 as shown in FIG. 2, so that the sheets are transferred to separate adjustable rotary drum cutoff shears 22a, 22b which cut the sheets to their respective desired lengths.

Therefore, when the product specification is changed, for example, to have different widths as well as different lengths $L_T$ and $L_D$ as shown in FIG. 8, the slit groove M has a discontinuous portion *, which is torn as the sheets diverge at the cutoff section 22 and defective boards are produced. Further, jamming frequently will occur if the defective torn sheet becomes caught in a downstream transfer feed roller.

To solve these problems, a cutting apparatus 31 as shown in FIGS. 9(a) and 9(b) has recently been proposed. This cutting apparatus forms a groove $N_o$ at predetermined central positions in the width direction of the corrugated board web 3, as shown in FIGS. 10 and 11. The central groove $N_0$ is produced by a knife cylinder 33 having a knife 32 fixed along the width thereof and a pressure plate mechanism 34 having a plurality of individual pressure pistons which selectively divides the corrugated web 3 into a plurality of sections in the width direction, each of which can be raised or lowered independently. The continuous web 3 is interposed between the knife cylinder 33 and the pressure plate mechanism 34 on an endless elastic belt 35 which is driven at predetermined timing intervals. As illustrated in FIGS. 10 and 11, a groove $N_0$ is formed in the central portion of the continuous web 3 by synchronously rotating the knife cylinder 33 and the elastic belt 35 while grasping the corrugated board web 3 at desired sections with the pressure plate mechanism 34 where the groove $N_0$ and the edge grooves are to be cut.

The system of FIGS. 9–11 produces a plurality of different kinds of corrugated product sheets having different cut lengths according to particular customer orders. Since a groove $N_0$ can be formed only at the portions of the web requiring the formation of a groove in the sheet width direction, torn sheets at the specification change point and other faults are eliminated even when the sheet width changes as shown in FIG. 10, as the central groove $N_0$ provides for continuity of the separation slit groove M between product specification changes for separating the sheets to the upper and lower stage cutoff devices 22a and 22b.

However, when the continuous web 3 is divided into many product sheets 5a–5d as shown in FIG. 11, some sheets such as sheets 5c and 5f are completely cut along their width by the groove $N_0$. As a result, a sheet with no continuity is created in the TOP sheet group or the DOWN sheet group passing to the cutoff device 22, such that control of the movement of the rear end of the old order sheet 5c and the front end of the new order sheet 5f is lost. Consequently, problems such as zigzag running of the sheets or variations in transfer speed occur. As a result, product sheet specifications such as the cutting length, angle, etc. become erratic, and various malfunctions and defects are caused until the sheet running conditions can be stabilized.

In summary, in a corrugation machine which produces a plurality of different kinds of product sheets from a single continuous web, use of the rotary shear 2 of FIG. 8 causes the position of the slit groove M to become discontinuous at the order change point, causing the sheets to be still connected to each other when sent to separate cutoff length devices at the next stage of the machine. Therefore, the sheets are torn by the vertical separation of the sheet running path to the upper and lower cutoff devices causing defective boards to be produced.

Use of the selective pressure plate mechanism of FIGS. 9–11 forms a central groove $N_0$ at a predetermined position along the width direction of the continuous web, so that the slit groove M is made continuous between separate product orders, eliminating tearing of a sheet at vertical separation. However, when the groove $N_0$ in the central portion of the corrugated board web extends across a plurality of product sheets, one or more completely cut sheets will be formed causing sheet transfer control to become unstable with resultant production faults and defects.

SUMMARY OF THE INVENTION

The present invention solves the above-described problems with the conventional systems. Accordingly, an object of the present invention is to provide a product order specification change system such that when the trim width at the ends of the corrugated board web is changed or when the sheet widths are changed in a multi-sheet production, a slit groove can be formed only at the required portion in the middle of the web. Breakage of sheets at the specification change point and other faults are thereby eliminated, and the corrugated board web can be transferred downstream in a continuous state. According to the invention, when the sheet width specifications change in a multi-sheet production order, new and old order corrugated board sheets are not completely separated and are transferred to a downstream stage without tearing of the sheets, thereby avoiding production of defective sheets as well as jamming of the corrugation machine.

To achieve the above object, the present invention provides an order specification change system for a corrugation machine which comprises a slitter-scorer device and a plurality of cutoff devices, wherein at an order change where specifications for the sheet width are changed from one order to the next, a region is formed between the front end of the new order sheets and the rear end of the old order sheets, wherein a transitional slit groove is cut connecting a slit groove of the old order sheets with a slit groove of the new order sheets. As a result, the web can be transferred stably, the cutting dimension accuracy can be maintained precisely, and faults such as jamming can be eliminated. Even if the position of the slit groove for separating sheets to upper and lower cutoff devices is varied at an order change, the slit groove for separating new and old order sheets can be made continuous. Moreover, the transitional slit groove for connection is formed slantwise at a predetermined angle with respect to the running direction of the continuous web. Therefore, there is no completely cut sheet even when the transitional slit groove extends across a plurality of separate corrugated board product sheets, permitting both new and old order sheets to be transferred downstream in a continuous state.

BRIEF DESCRIPTION OF THE DRAWINGS

The present invention will become more fully understood from the detailed description below in conjunction with the accompanying drawings, which are presented for illustrative purposes only and which are not to be construed as limitative of the present invention, and wherein.

DETAILED DESCRIPTION OF THE PREFERRED AND ALTERNATE EMBODIMENTS

Figure 1:
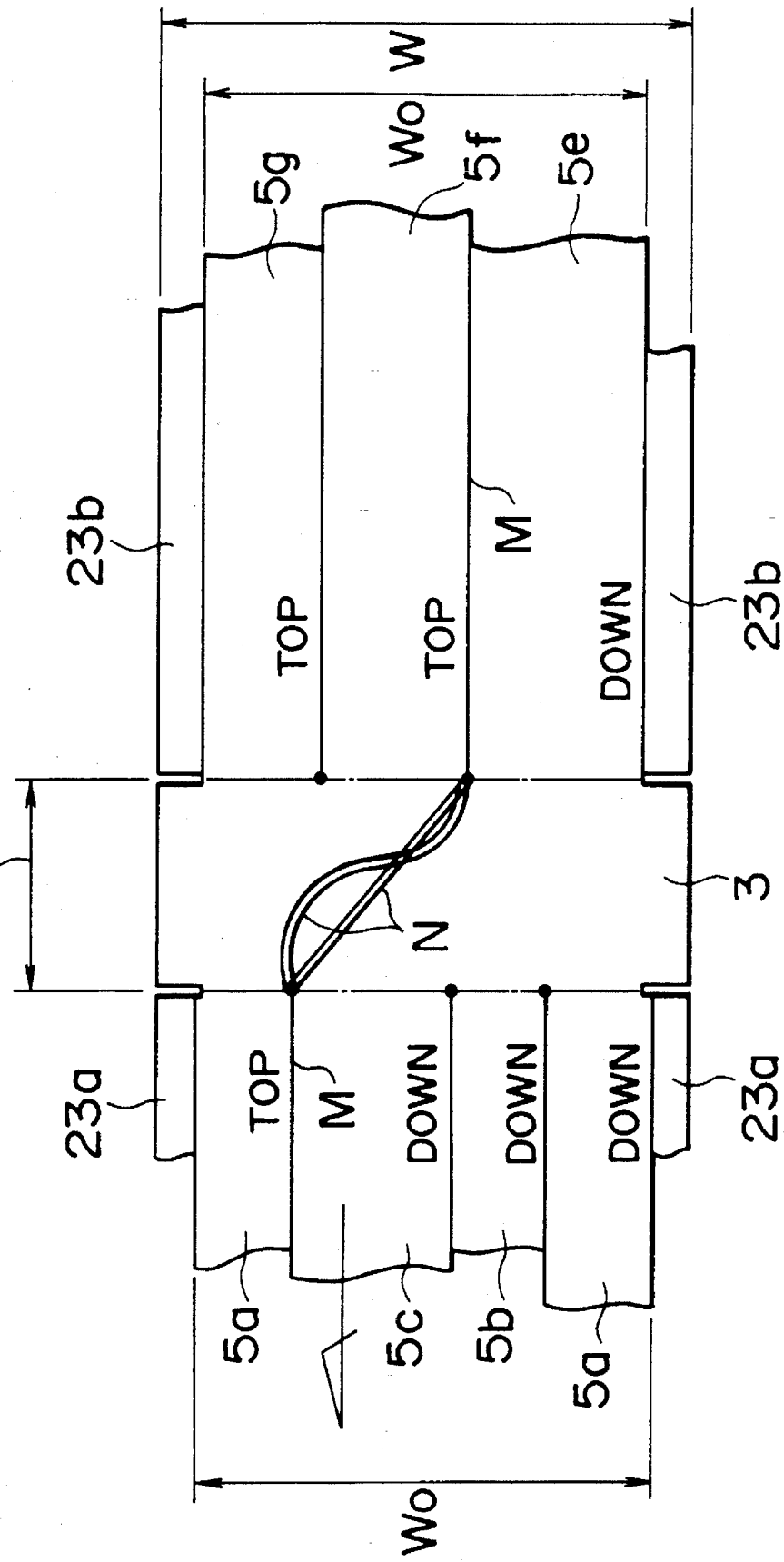
FIG. 1 is a plan view illustrating the processing of a corrugated board web on a corrugation machine in accordance with one embodiment of the present invention.

The present invention now will be described with reference to FIGS. 1 through 7. FIG. 1 shows the processing of a product order specification change according to the invention and FIG. 2, described in detail above, shows the basic configuration of an order change system in a corrugation machine applicable to the present invention. FIGS. 3 through 7 show various constructions of cutting apparatus according to different embodiments of the present invention for forming a transitional slit groove of a predetermined length in an inclined direction at a desired central position of the corrugated board web.

Figure 2:
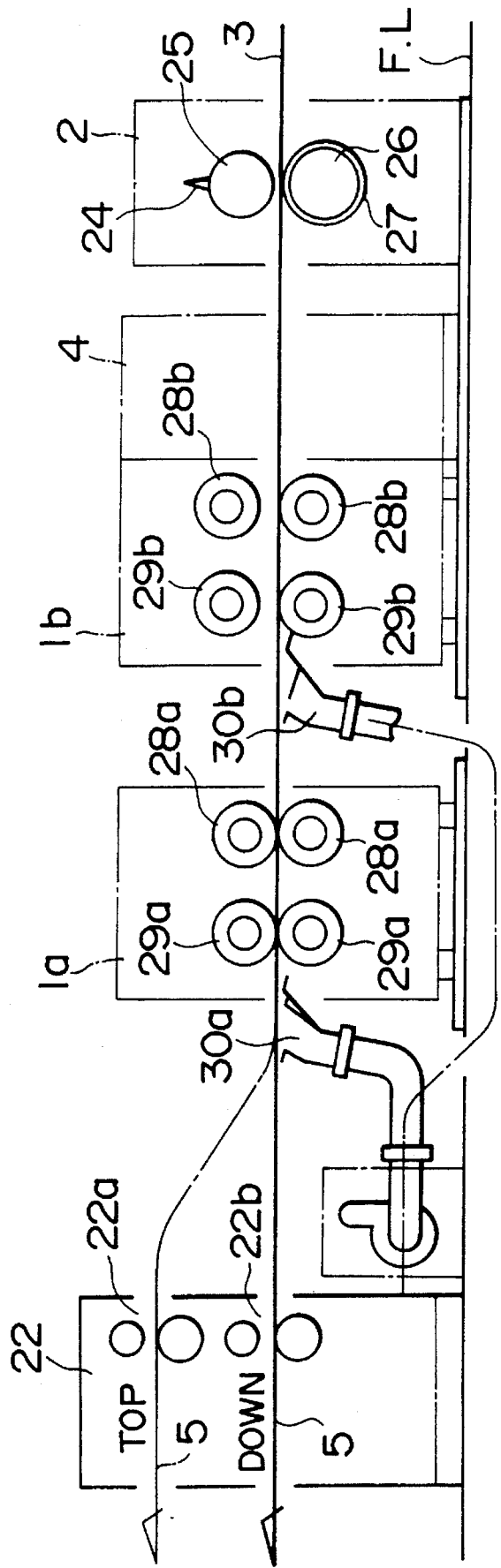
FIG. 2 is a side view of a corrugation machine of a type applicable to the present invention.

With reference to FIG. 2, the system of the present invention comprises a corrugation machine having a cutting apparatus 4 which can form a transitional slit groove N (see FIG. 1) having a desired angle and length in an order change region with respect to the running direction of the corrugated board web 3 at a desired position on the corrugated board web 3. The rotary shear 2 and the cutting apparatus 4 are operated synchronously at predetermined times corresponding to product order change points, so that a slit groove M for separating product sheets (such as 5a and 5c of FIG. 1) to upper and lower stage cutoff devices 22a and 22b is made continuous while the trims (23a, 23b) of new and old orders are separated to be disposed of, thereby preventing the tearing of sheets and permitting a stable change of orders without generation of faults.

Figure 3A:
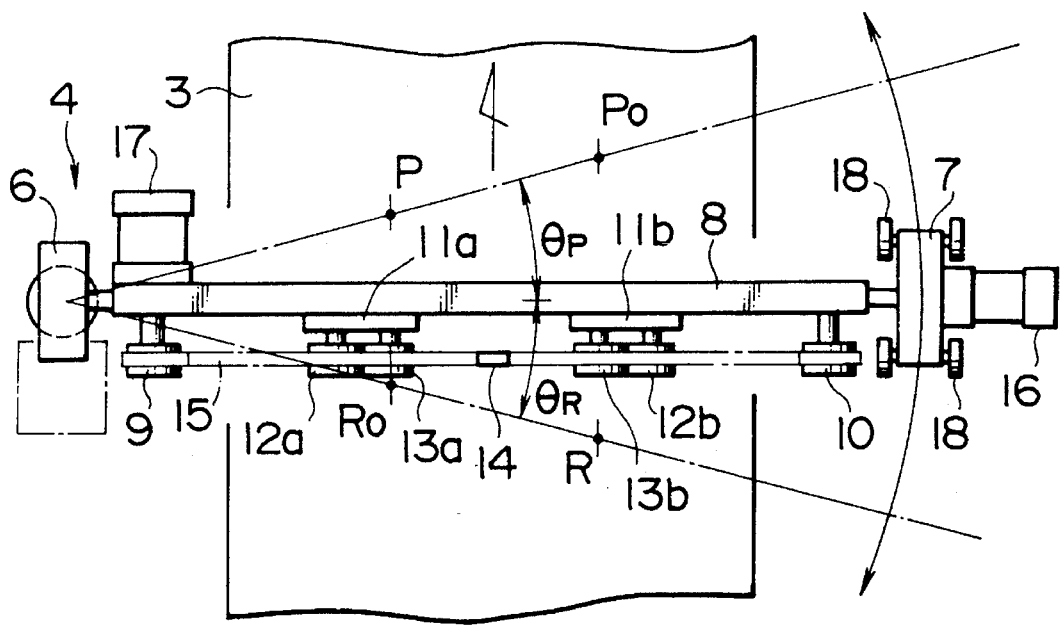
FIG. 3(a) is a plan view of a cutting apparatus according to one preferred embodiment of the present invention for forming a transitional slit groove of an arbitrary angle and length in a corrugated board web with respect to the web running direction at a predetermined central position along the width direction of the web.
Figure 4:
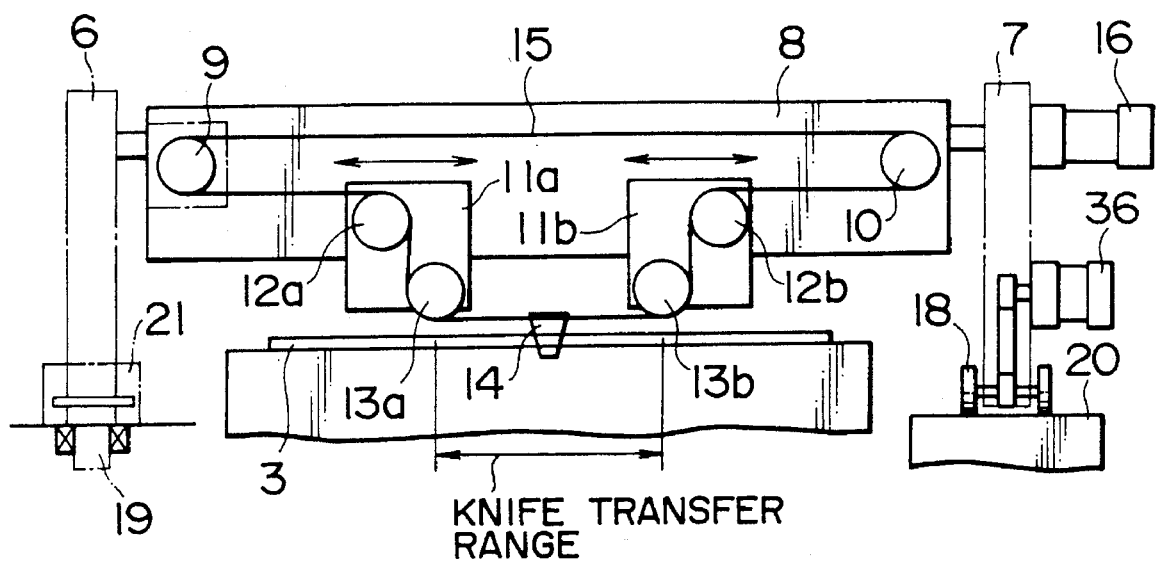
FIG. 4 is a front view of the cutting apparatus of FIG. 3(a)
Figure 5:
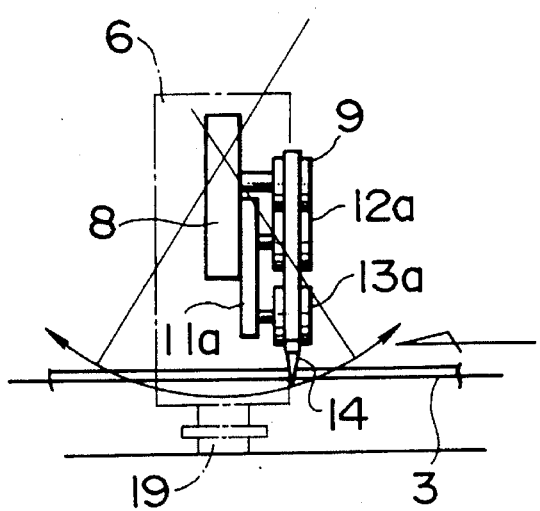
FIG. 5 is a side view of the cutting apparatus of FIG. 3(a)

The general configuration and functions of the inventive cutting apparatus will be described below. The cutting apparatus 4 for the corrugated board web 3 shown in FIG. 3(a), FIG. 4 and FIG. 5 is provided with two sets of sprockets 9 and 10 which are fixedly mounted on an oscillating plate 8. Movable brackets 11a and 11b move in the axial direction on the surface of the oscillating plate 8. Oscillating plate 8 is pivotally mounted to a rotating frame 6 at one end thereof and is mounted to a moving frame 7 at the other end thereof.

Two sets of sprockets 12a–13a and 12b–13b are pivotally mounted on the movable brackets 11a and 11b respectively. An endless chain 15 having a knife 14 fixed thereto is wound between the sprockets 9 and 10 and between the sets of sprockets 12a–13a and 12b–13b as most clearly seen in FIG. 4. Reference numeral 16 in FIG. 3(a) denotes a motor for pivoting the oscillating plate 8 about its axis in the running direction of the corrugated web 3, as shown by the arcuate arrow shown in FIG. 5. Reference numeral 17 denotes a motor for reciprocating the knife 14 across the width of the corrugated web 3 by rotating the sprocket 9 which in turn rotates the endless chain 15 having the knife 14 mounted thereon. In FIG. 4, a motor 36 rotates running wheels 18 mounted at the bottom of the moving frame 7 to run the moving frame 7 along a surface 20 in an arc about the supporting axis 19 of the rotating frame 6 (as shown by the arcuate arrow in FIG. 3(a)), to incline the oscillating plate 8 at a predetermined angle θ relative to the width direction of the corrugated board web 3 perpendicular to the running direction of the web. Reference numeral 21 is an angle detecting means: for detecting the swing angle θ of the oscillating plate 8.

The movable brackets 11a and 11b are constructed so as to move independently in the axial direction of the oscillating plate 8. Therefore, the knife transfer range (or cutting length) in FIG. 4 can be set by adjusting the relative distance between the brackets 11a and 11b. The oscillating plate 8 is pivoted about its axis by motor 16 in synchronization with the running speed of the corrugated board web 3, so as to reduce the cutting resistance of the knife 14 with respect to the corrugated board web.

Figure 3B:
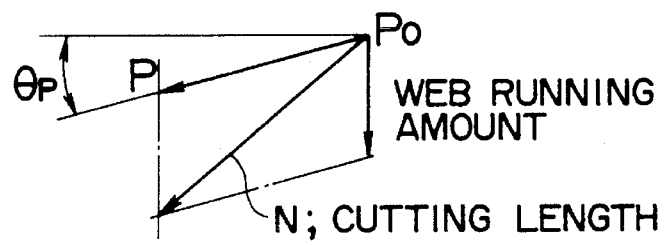
FIG. 3(b) is a diagram showing the relationship between a knife transfer amount, a web running amount, and a cutting length of a product sheet in a cutting apparatus according to the present invention.
Figure 3B:
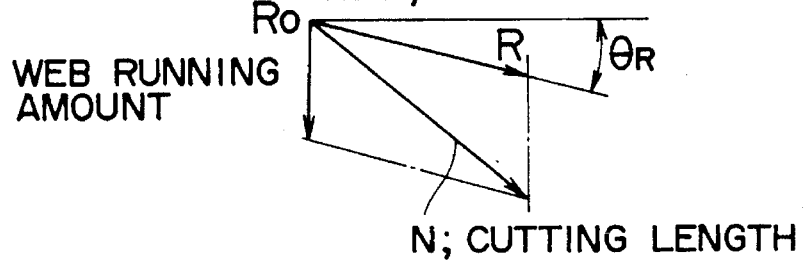

The cutting apparatus 4 is capable of cutting a transitional slit groove N in an order change region of a continuous corrugated board web 3 as shown in FIG. 1 at any desired angle and having any desired cutting length. As shown in FIG. 3(b), the angle and length of the transitional slit groove N can be represented as a vector equal to the sum of a web running amount vector and an oscillating plate vector having an amplitude equal to the knife transfer range and an angle θ equal to the angle of the plate 8 relative to the width direction of the web perpendicular to the web running direction. The plate 8 can be oriented at a positive angle $\theta_P$ in the positive web running direction or at a reverse angle $\theta_R$ reverse to the web running direction as shown in FIG. 3(a). The points $P_0$ and $R_0$ represent the position of the slit groove M along the web width for an existing production run prior to an order change, and the points P and R represent the new position of slit groove M for the new product order after the order change. The direction of the transition from the old position of groove M to the new position of groove M determines whether the plate 8 should be pivoted at a positive angle $\theta_P$ or a negative angle $\theta_R$. The distance from $R_0$ to R or from $P_0$ to P, which is known by comparing the old and new order specifications, is used as the set distance between the brackets 11a and 11b to form the knife transfer amount or range. The cutting length of the transitional slit groove N is a function of the web running amount, or length of web 3 passing under the plate 8, during the time that the knife 14 traverses from one of the brackets 11a or 11b to the other. The cutting length may be adjusted by changing either or both of the running speed of the web 3 or the speed of the motor 17 which rotates the endless belt 15. Varying the speeds during cutting of the transitional slit groove N allows any desired shape slit groove to be formed as shown in FIG. 1.

Figure 6:
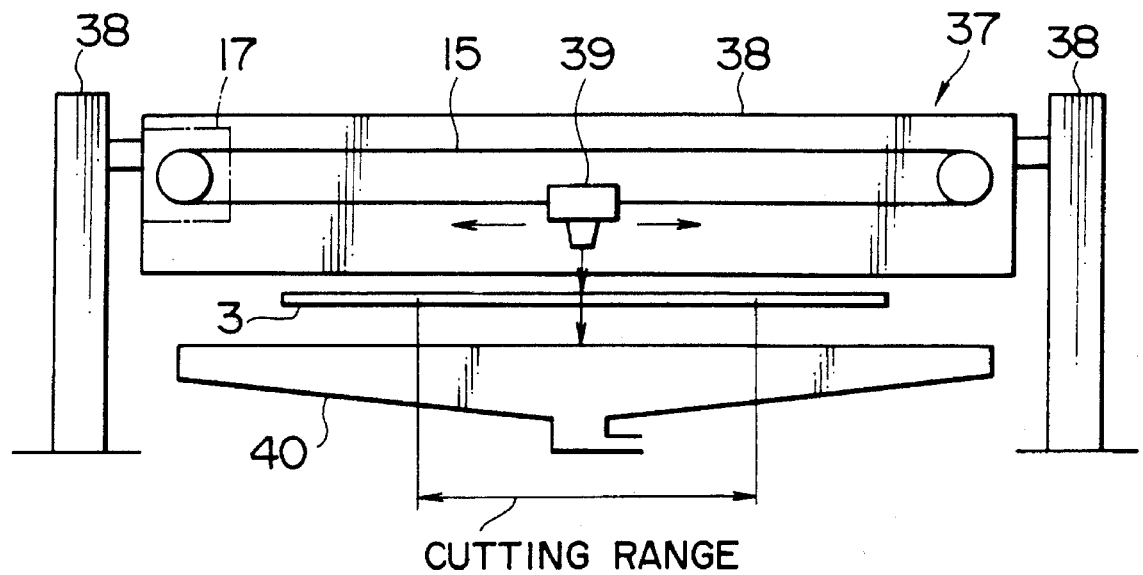
FIG. 6 is a front view of a cutting apparatus according to a second embodiment of the present invention.
Figure 7:
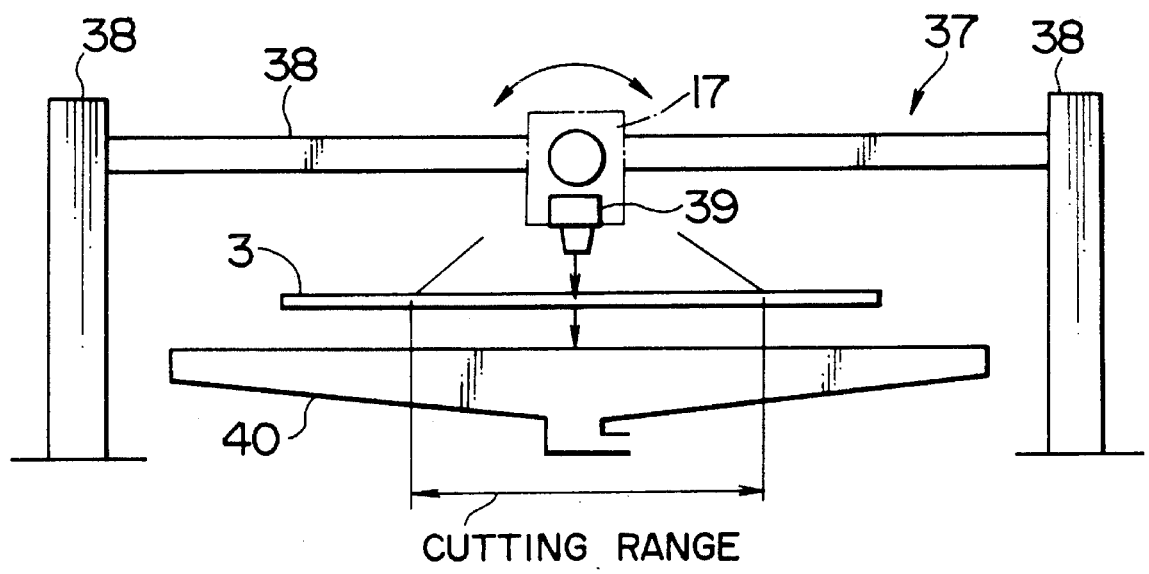
FIG. 7 is a front view of a cutting apparatus in accordance with a third embodiment of the present invention.
Figure 8:
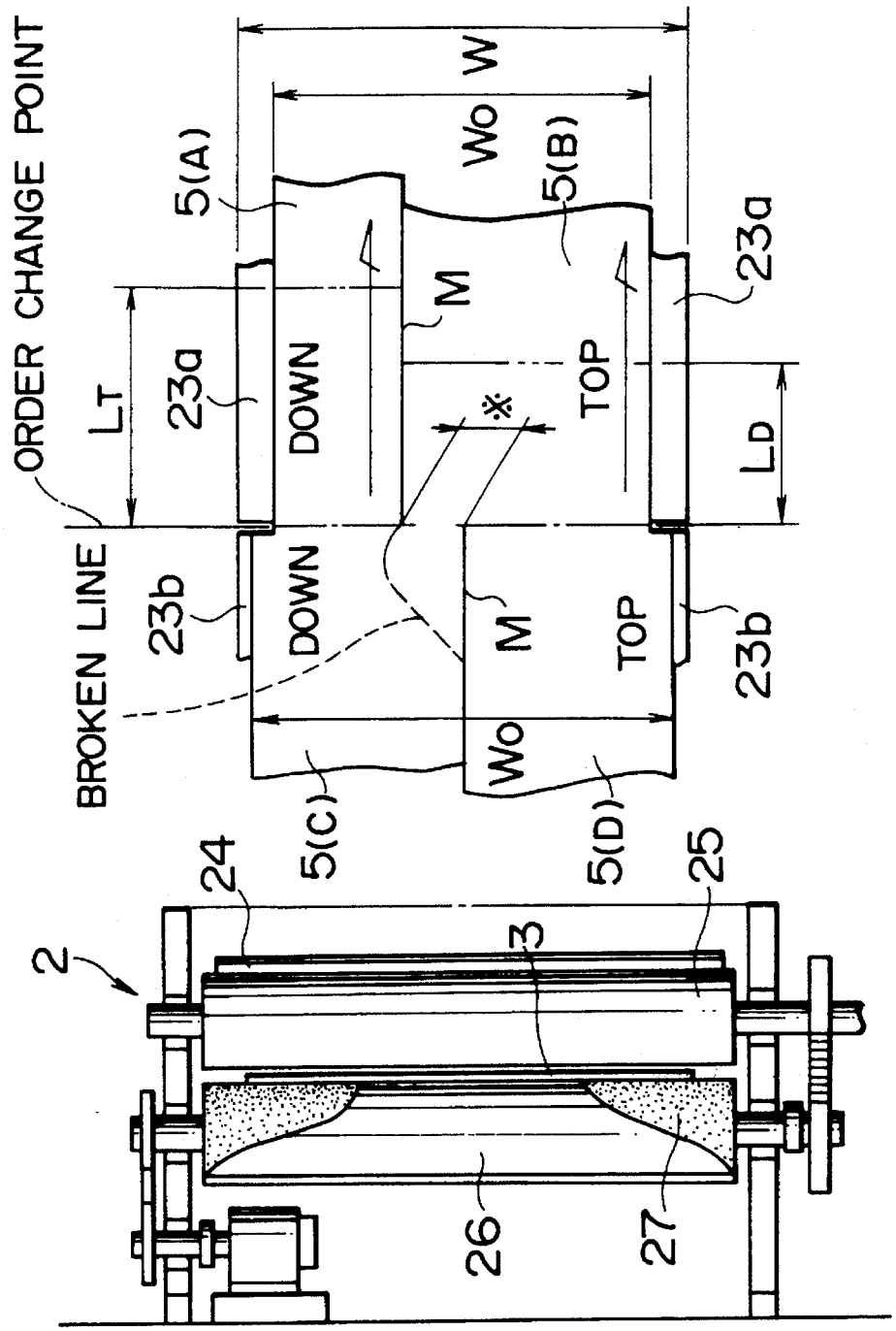
FIG. 8 is a plan view of a conventional rotary shear and an illustration of faults produced by the conventional rotary shear.
Figure 9A:
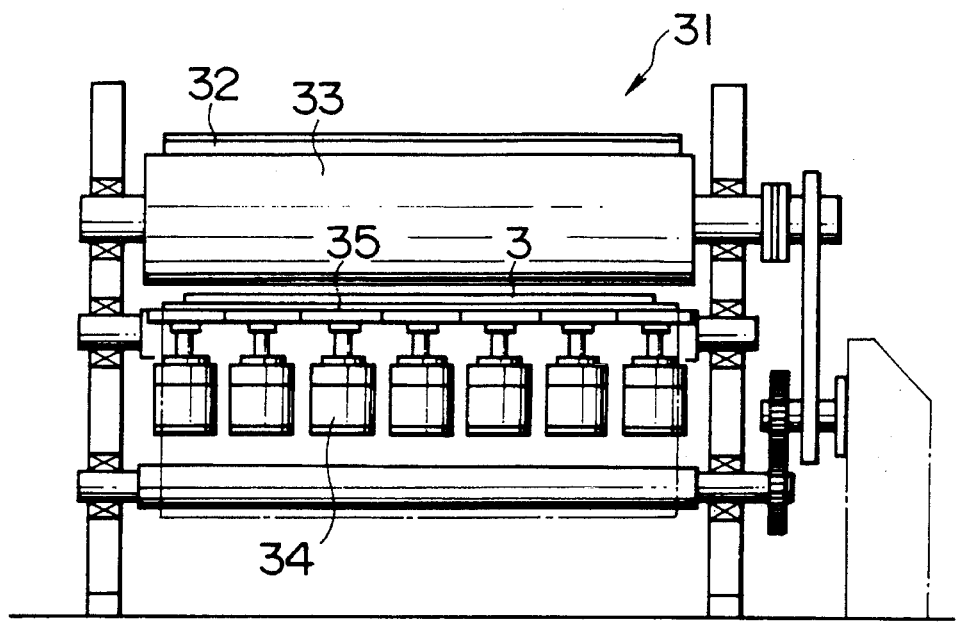
FIGS. 9(a) and 9(b) are a front view and a side view, respectively, of a conventional cutting apparatus for forming a central groove at a predetermined central position in the width direction of a corrugated board web.
Figure 9B:
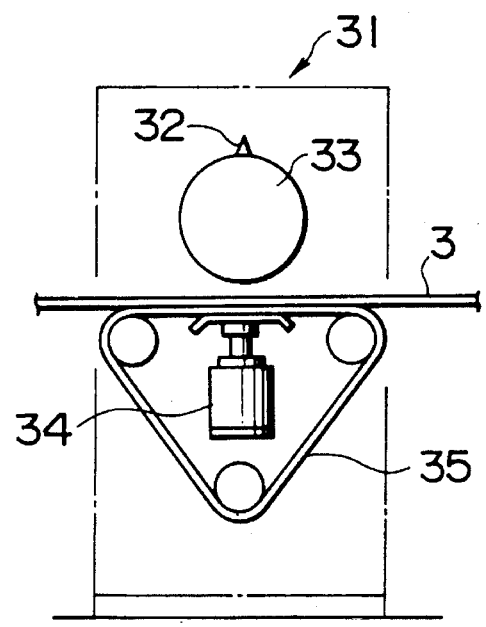
Figure 10:
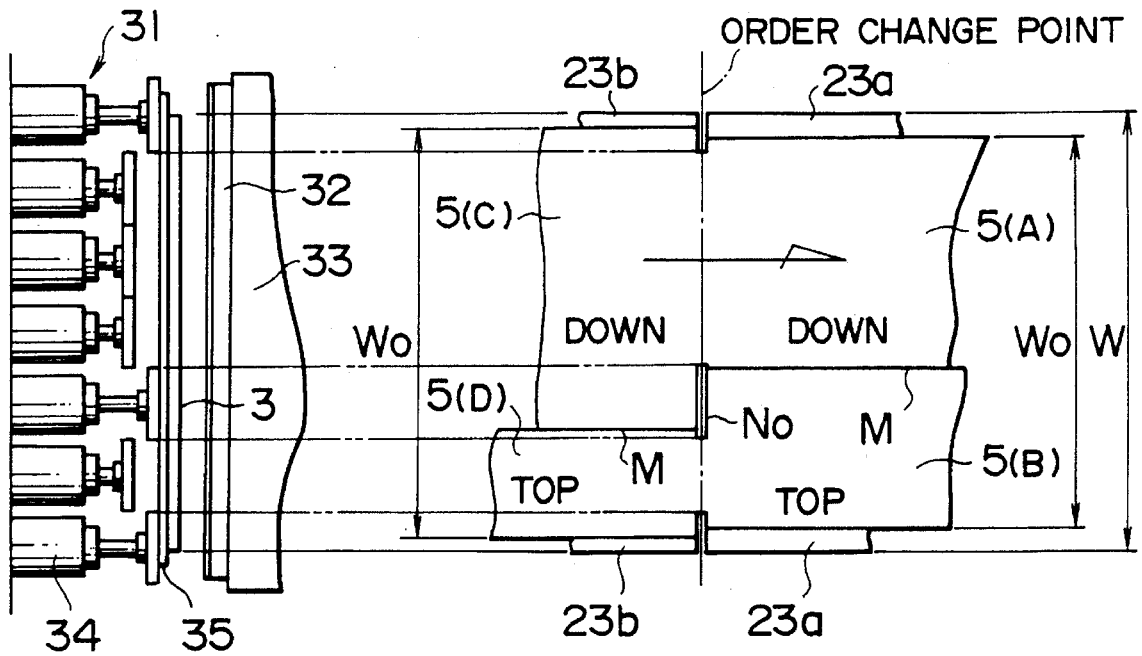
FIG. 10 is a diagram illustrating the cutting condition and faults produced the cutting apparatus shown in FIGS. 9(a) and 9(b) for a two-sheet production.
Figure 11:
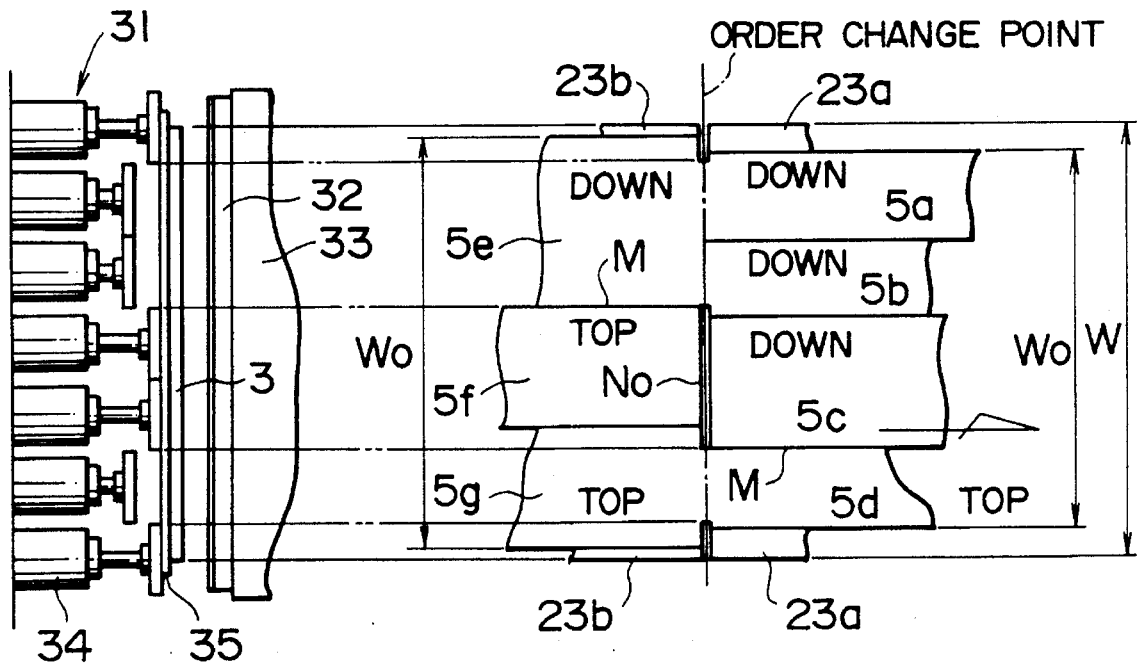
FIG. 11 is a diagram illustrating the cutting condition and faults produced by the cutting apparatus shown in FIGS. 9(a) and 9(b) for a multi-sheet production.

A cutting apparatus 37 according to other embodiments of the invention is shown in FIGS. 6 and 7. These embodiments use either a water jet or a laser beam in place of the knife 14 on the cutting apparatus shown in FIGS. 3 through 5. Thus, the order change region between the boundaries of new and old order sheets can be separated by cutting a transitional groove in any desired shape.

Reference numeral 38 denotes a frame for supporting an endless chain or belt 15, 39 denotes a water jet nozzle or laser beam device mounted to the chain 15, and 40 denotes a receiving member for the water jet or laser beam which is mounted under the water jet nozzle or laser beam device. In the embodiment of FIG. 7, motor 17 directly rotates the water jet nozzle or laser beam device 39 without the use of an endless belt. The cutting apparatus 37 for the central portion of the web 3 is operated in a real-time mode in conjunction with the conventional rotary shear 2.

The invention having been thus described, it will be apparent to those skilled in the art that the same may be varied in many ways without departing from the spirit of the invention. Any and all such modifications are intended to be included within the scope of the following claims.

What is claimed is:

1. An apparatus for a corrugation machine which produces a plurality of corrugated board sheets of various widths and lengths simultaneously from a single continuous corrugated board web, comprising:

slitter-scorer means including slitter means for forming slit grooves in said web for dividing the web into separate product sheets and scorer means for forming score lines on said web, said slitter-scorer means for receiving said continuous corrugated board web and capable of forming slit grooves and score lines in said web while said web passes through said slitter-scorer means;

a plurality of sheet length cut-off devices for cutting said web into sheets of desired lengths, said plurality of cut-off devices being downstream of said slitter-scorer means, said plurality of cut-off devices including at least first and second cut-off devices which are vertically disposed with respect to each other at different heights, wherein said web divides after passing through said slitter-scorer means and divided portions of said web pass to different cut-off devices, so that the first cut-off device receives a first portion of the divided web, and the second cut-off device receives a second portion of the divided web;

means for cutting a transitional slit groove in an order change region of said continuous corrugated board web, wherein the order change region extends from trailing ends of sheets produced according to a first production order to leading ends of sheets to be produced according to a second production order, said cutting means configured to form said transitional slit groove so as to join a central slit groove separating sheets of said first production order with a central slit groove separating sheets of said second production order, wherein said central slit grooves divide said web into said first and second web portions which are received by respective first and second cut-off devices; and means for controlling said cutting means so as to form said transitional slit groove at a desired one of a range of angles with respect to the width direction of said sheets perpendicular to a running direction of said web through said corrugation machine so as to maintain continuity of each of said first and second web portions without completely severing and separating a product sheet from one of said web portions.

2. A cutting apparatus as set forth in claim 1, wherein said cutting means comprises a knife fixed to an endless belt, said endless belt being mounted on sprockets fixed on a plate located adjacent to said web and mounted on a rotating frame, and means for driving said endless belt so as to traverse said knife across said order change region; and wherein said controlling means comprises means for pivoting said plate about an axis of said rotating frame to a predetermined position so as to cause said knife to form said transitional slit groove at said desired one of said plurality of angles.

3. A cutting apparatus as set forth in claim 1, wherein said cutting means comprises a water jet nozzle which generates a water jet sufficient to form said transitional slit groove in said order change region of said web, said water jet nozzle being mounted on a frame located adjacent said web; and wherein said controlling means comprises means for traversing said water jet across said web to cause said water jet to form said transitional slit groove at said desired one of said plurality of angles.

4. A cutting apparatus as set forth in claim 3, further comprising an endless belt mounted on said frame, said water jet nozzle being fixed to said endless belt, and wherein said means for traversing comprises a motor for rotating said endless belt.

5. A cutting apparatus as set forth in claim 3, wherein said means for traversing comprises a motor for pivoting said water jet nozzle about an axis in the running direction of said web.

6. A cutting apparatus as set forth in claim 1, wherein said cutting means comprises a laser beam device which generates a laser beam sufficient to form said transitional slit groove in said order change region of said web, said laser beam device being mounted on a frame located adjacent said web; and wherein said controlling means comprises means for traversing said laser beam across said web to cause said laser beam to form said transitional slit groove at said desired one of said plurality of angles.

7. A cutting apparatus as set forth in claim 6, further comprising an endless belt mounted on said frame, said laser beam device being fixed to said endless belt, and wherein said means for traversing comprises a motor for rotating said endless belt.

8. A cutting apparatus as set forth in claim 6, wherein said means for traversing comprises a motor for pivoting said laser beam device about an axis in the running direction of said web.

9. A corrugation machine, comprising:

a rotary shear for cutting notches of selected lengths at edges of a continuous corrugated board web in the width direction of said web perpendicular to a running direction of said web through said machine;

slitter-scorer means including slitter means for forming slit grooves in said web for dividing the web into separate product sheets and scorer means for forming score lines on said web, said slitter-scorer means for receiving said continuous corrugated board web and capable of forming slit grooves and score lines in said web while said web passes through said slitter-scorer means;

a plurality of sheet length cut-off devices for cutting said web into sheets of desired lengths, said plurality of cut-off devices being downstreams of said slitter-scorer means, said plurality of cut-off devices including at least first and second cut-off devices which are vertically disposed with respect to each other at different heights, wherein said web devices after passing through said slitter-scorer means and divided portions of said web pass to different cut-off devices, so that the first cut-off device receives a first portion of the divided web, and the second cut-off device receives a second portion of the divided web;

a cutting apparatus, including:

means for cutting a transitional slit groove in an order change region of said continuous corrugated board web, wherein the order change region extends from trailing ends of sheets produced according to a first production order to leading ends of sheets to be produced according to a second production order, said cutting means configured to form said transitional slit groove so as to join a central slit groove separating sheets of said first production order with a central slit groove separating sheets of said second production order, wherein said central slit grooves divide said web into said first and second web portions which are received by respective first and second cut-off devices; and means for controlling said cutting means so as to form said transitional slit groove at a desired one of range of angles with respect to the width direction of said sheets perpendicular to a running direction of said web through said corrugation machine so as to maintaining continuity of each of said first and second web portions without completely severing and separating a product sheet from one of said web portions;

wherein said slitter-scorer means is configured for cutting trim grooves between said notches for removing peripheral trim sections from said web; and wherein the corrugation machine further includes means for removing and disposing of said trim sections.

10. A corrugation machine as set forth in claim 9, wherein said cutting means comprises a knife fixed to an endless belt, said endless belt being mounted on sprockets fixed on a plate located adjacent to said web and mounted on a rotating frame, and means for driving said endless belt so as traverse said knife across said order change region; and wherein said controlling means comprises means for pivoting said plate about an axis of said rotating frame to a predetermined position so as to cause said knife to form said transitional slit groove at said desired one of said plurality of angles.

11. A corrugation machine as set forth in claim 9, wherein said cutting means comprises a water jet nozzle which generates a water jet sufficient to form said transitional slit groove in said order change region of said web, said water jet nozzle being mounted on a frame located adjacent said web; and wherein said controlling means comprises means for traversing said water jet across said web to cause said water jet to form said transitional slit groove at said desired one of said plurality of angles.

12. A corrugation machine as set forth in claim 11, further comprising an endless belt mounted on said frame, said water jet nozzle being fixed to said endless belt, and wherein said means for traversing comprises a motor for rotating said endless belt.

13. A corrugation machine as set forth in claim 11, wherein said means for traversing comprises a motor for pivoting said water jet nozzle about an axis in the running direction of said web.

14. A corrugation machine as set forth in claim 9, wherein said cutting means comprises a laser beam device which generates a laser beam sufficient to form said transitional slit groove in said order change region of said web, said laser beam device being mounted on a frame located adjacent said web; and wherein said controlling means comprises means for traversing said laser beam across said web to cause said laser beam to form said transitional slit groove at said desired one of said plurality of angles.

15. A corrugation machine as set forth in claim 14, further comprising an endless belt mounted on said frame, said laser beam device being fixed to said endless belt, and wherein said means for traversing comprises a motor for rotating said endless belt.

16. A corrugation machine as set forth in claim 14, wherein said means for traversing comprises a motor for pivoting said laser beam device about an axis in the running direction of said web.

17. A method for changing over product orders in a corrugation machine which produces corrugated board sheets having various widths and lengths according to specifications of said product orders from a single continuous corrugated board web running through said machine, comprising the steps of:

providing slitter-scorer means including slitter means for forming slit grooves in said web for dividing the web into separate product sheets and scorer means for forming score lines on said web, said slitter-scorer means for receiving said continuous corrugated board web and capable of forming slit grooves and score lines in said web while said web passes through said slitter-scorer means;

providing a plurality of sheet length cut-off devices for cutting said web into sheets of desired lengths, said plurality of cut-off devices being downstream of said slitter-scorer means, said plurality of cut-off devices including at least first and second cut-off devices which are vertically disposed with respect to each other at different heights, wherein said web divides after passing through said slitter-scorer means and divided portions of said web pass to different cut-off devices, so that the first cut-off device receives a first portion of the divided web, and the second cut-off device receives a second portion of the divided web;

forming an order change region free of a central slit groove in said web, wherein said region extends from trailing ends of sheets produced in a first product order to leading ends of sheets to be produced in a second product order; and forming a transitional slit groove in said order change region of said web connecting a central slit groove of said first order to a central slit groove of said second order, wherein said central slit grooves divide said web into said first and second web portions which are received by respective first and second cut-off devices, wherein continuity of each of said first and second web portions is maintained without completely severing and separating a product sheet from one of said web portions, and wherein said transitional slit groove forms a positive angle with respect to a width direction of said web, said width direction of said web being perpendicular to the running direction of said web.

18. An apparatus for a corrugation machine which produces a plurality of corrugated board sheets of various widths and lengths simultaneously from a single continuous corrugated board web, comprising:

slitter-scorer means including slitter means for forming slit grooves in said web for dividing the web into separate product sheets and scorer means for forming score lines on said web, said slitter-scorer means for receiving said continuous corrugated board web and capable of forming slit grooves and score lines in said web while said web passes through said slitter-scorer means;

a plurality of sheet length cut-off devices for cutting said web into sheets of desired lengths, said plurality of cut-off devices being downstream of said slitter-scorer means, said plurality of cut-off devices including at least first and second cut-off devices which are vertically disposed with respect to each other at different heights, wherein said web divides after passing through said slitter-scorer means and divided portions of said web pass to different cut-off devices, so that the first cut-off device receives a first portion of the divided web, and the second cut-off device receives a second portion of the divided web; and a transitional slit groove cutting apparatus for forming a transitional slit groove in an order change region from the trailing ends of sheets produced according to a first production order to leading ends of sheets to be produced according to a second production order, wherein said transitional slit groove cutting apparatus joins a central slit groove separating sheets of said first production order with a central slit groove separating sheets of said second production order, and wherein said central slit grooves divide said web into said first and second web portions which are received by respective first and second cut-off devices, the transitional slit groove cutting apparatus comprising:

an oscillating plate having two ends and being pivotally mounted transverse to a running direction of the single continuous corrugated board web with one of the two ends on one side of the web and the other of the two ends on the other side of the web, the oscillating plate capable of pivoting about one of its ends to determine the angle of the transitional slit groove;

a transitional slit groove length controller means, mounted on said oscillating plate, for controlling the length of the transitional slit groove and the location of the transitional slit groove along the oscillating plate so as to maintain continuity of each of said first and second web portions without completely severing and separating a product sheet from one of said web portions; and a cutting means for cutting a transitional slit groove in the continuous corrugated board web, the cutting means attached to said transitional slit groove length controller.

19. The apparatus of claim 18 further including a motor coupled to the oscillating plate to pivot the plate about a line formed between the two ends of the oscillating plate in synchronization with a running speed of the continuous corrugated board web.

* * * * *

UNITED STATES PATENT AND TRADEMARK OFFICE
CERTIFICATE OF CORRECTION

PATENT NO. : 5,496,431
DATED : March 5, 1996
INVENTOR(S) : Tadashi Hirakawa et al.

It is certified that error appears in the above-indentified patent and that said Letters Patent is hereby corrected as shown below:

Col. 1, line 56, "11a" should be -- 1a --; Col. 6, line 11, delete the colon; Col. 9, line 18 (claim 9), "maintaining" should be -- maintain --.

Signed and Sealed this

Eighteenth Day of June, 1996

Attest:

BRUCE LEHMAN

Attesting Officer   Commissioner of Patents and Trademarks